United States Patent

Thienot et al.

[15] 3,687,914

[45] Aug. 29, 1972

[54] COPOLYMERS OF 2-PHENYL ALLYL ALCOHOL AND BUTADIENE, TERPOLYMERS THEREOF WITH STYRENE, AND THEIR PREPARATION

[72] Inventors: Marc O. Thienot, Park Forest, Ill.; Joseph A. Verdol, White Plains, N.Y.

[73] Assignee: Atlantic Richfield Company, New York, N.Y.

[22] Filed: Jan. 6, 1969

[21] Appl. No.: 789,380

[52] U.S. Cl. .............. 260/82.1, 260/80.7, 260/88.1, 260/91.3, 260/93.5, 260/621
[51] Int. Cl. .......................... C08d 3/02, C08d 1/22
[58] Field of Search .......... 260/82.1, 88.1, 91.3, 93.5, 260/621, 80.7

[56] References Cited

UNITED STATES PATENTS

| | | | |
|---|---|---|---|
| 2,383,055 | 8/1945 | Fryling | 260/84.5 |
| 2,563,611 | 8/1951 | Mills et al. | 260/88.1 |
| 2,951,831 | 9/1960 | Reinhard et al. | 260/80.7 |
| 3,156,674 | 11/1964 | Shokal et al. | 260/80.7 |
| 3,230,205 | 1/1966 | Keith | 260/85.5 |
| 3,401,213 | 9/1968 | Trementozzi et al. | 260/880 |
| 3,498,943 | 3/1970 | Dannalls | 260/29.6 |
| 2,471,959 | 1/1948 | Hunt | 260/89.5 |

*Primary Examiner*—Joseph L. Schofer
*Assistant Examiner*—Richard A. Gaither
*Attorney*—John W. Behninger, Eugene L. Bernard, Martin J. Brown, James N. Dresser, W. Brown Morton, Jr., John T. Roberts and Malcolm L. Sutherland

[57] ABSTRACT

Copolymers are obtained consisting essentially of 2-phenyl allyl alcohol and butadiene in molar ratio of about 1:1 to 1:22, the major portion of the butadiene in the copolymer having the trans-1-4-structure. Terpolymers are obtained consisting essentially of 2-phenyl allyl alcohol, butadiene and styrene in molar ratios of about 1:2–3:1–4. The copolymers vary from viscous oily copolymers to firm, rubbery copolymers. The terpolymers are rubbery and can be used as synthetic rubbers. The copolymers are useful to prepare cross-linkable coatings, plasticizers and adhesives. High yields, often quantitative, of the copolymers are obtained with an azo catalyst. Water soluble persulfate catalysts and azo catalysts in aqueous medium give good yields of the terpolymers.

1 Claim, No Drawings

COPOLYMERS OF 2-PHENYL ALLYL ALCOHOL AND BUTADIENE, TERPOLYMERS THEREOF WITH STYRENE, AND THEIR PREPARATION

This invention relates to copolymers of 2-phenyl allyl alcohol and butadiene and to terpolymers of 2-phenyl allyl alcohol, butadiene and styrene and to methods for their preparation. In a particular aspect, this invention relates to methods for preparing these novel copolymers and terpolymers involving polymerization in bulk with azo catalysts or in aqueous media, preferably emulsion polymerization, initiated with azo catalysts or water soluble persulfates, or solution polymerization initiated with hydrocarbon hydroperoxides.

Polymers of allyl alcohol are, in general, difficult to prepare. Resinous materials produced by the conjoint polymerization of styrene and 2-phenyl allyl alcohol have been described in U.S. Pat. No. 2,563,611 to Mills et al., issued Aug. 7, 1951. The polymerization processes disclosed for the preparation of these copolymers are (1) mass polymerization with an oxygen producing substance, such a benzoyl peroxide, hydrogen peroxide, acetyl peroxide, or other peroxide which is soluble in the monomer and (2) polymerization in an aqueous medium catalyzed with a water soluble peroxide, such as sodium peroxide, hydrogen peroxide, potassium persulfate, or potassium perborate, and usually with an emulsifying agent. However, the mixture of monomers required heating for 12 days and copolymers of not more than 30 percent 2-phenyl allyl alcohol are disclosed.

In accordance with the present invention novel polymers of 2-phenyl allyl alcohol and butadiene are obtained containing in the range of about 10 to 75 weight percent of 2-phenyl allyl alcohol and in the range of about 90 to 25 weight percent of butadiene. The monomer concentrations may be varied to provide polymers ranging from 1:1 or less to 1:22 or greater molar ratios of 2-phenyl allyl alcohol to butadiene. Thus copolymers are prepared with molar ratios of 2-phenyl allyl alcohol to butadiene of 1:1, 1:2 1:4, 1:5, 1:10 and 1:22. At 1:1 monomer ratios alternating copolymers of 2-phenyl allyl alcohol and butadiene are formed having a hydrocarbon chain consisting essentially of the addition of 2-phenyl allyl alcohol and butadiene monomers alternating with substantially near perfect regularity along the chain. The methylol and phenyl groups of 2-phenyl allyl alcohol are connected directly to the polymer hydrocarbon chain. Infra red absorption spectra of 2-phenyl allyl alcohol and butadiene polymers prepared by 2,2'-azobis-isobutyronitrile and tertiary butyl hydroperoxide catalysts were obtained and showed that the major portion of the butadiene in the polymer structure consisted of trans-1-4-links, with a lesser amount of pendant vinyl-1-2-units, and few cis-1-4-links.

It was found that the average degree of polymerization of 2-phenyl allyl alcohol and butadiene varied from about 3–4 to 10–12, corresponding to a copolymer molecular weight up to about 2,000. The polymers are of low molecular weight and vary from viscous oily copolymers to firm rubbery copolymers. With 2,2'-azobisisobutyronitrile catalyst, rubbery copolymers can be obtained which are insoluble in most organic solvents with the exception of chloroform, dioxane and tetrahydrofuran. These rubbery copolymers have a melting range of about 40° to 50°C.

Novel terpolymers of 2-phenyl allyl alcohol, butadiene and styrene are obtained containing in the range of about 18 to 40 weight percent of 2-phenyl allyl alcohol, in the range of about 16 to 42 weight percent of butadiene and in the range of about 66 to 18 weight percent of styrene. The monomer concentrations may be varied to provide terpolymers wherein the molar ratio of 2-phenyl allyl alcohol to butadiene to styrene is in the range of about 1:2 – 3:1 – 4. Thus terpolymers are prepared containing about 20 weight percent of 2-phenyl allyl alcohol, about 20 weight percent of butadiene and about 60 weight percent of styrene. Likewise terpolymers are obtained containing about 30 weight percent of 2-phenyl allyl alcohol, about 30 weight percent of butadiene and about 40 weight percent styrene.

Since these copolymers and terpolymers contain reactive hydroxyl groups, they are polyols and can be reacted with diisocyanates to form polyurethanes. The viscous flowing liquid copolymers can be used as liquid castable copolymers. The terpolymers are useful as synthetic rubbers. All of these copolymers and terpolymers can be used to prepare crosslinkable coatings, plasticizers and adhesives where the reactive hydroxyl groups of these polymers may be utilized in reactions with other reactive monomers and polymers to effect curing and crosslinking. For example, these polymers may be combined with saturated and unsaturated acids, prepolymers and isocyanate monomers. They can also be used for the production of molding compounds, coating compositions, latex emulsions, lubricating oil additives and wax additives. The polymers of this invention can have a relative high weight percent of bound 2-phenyl allyl alcohol and thus have superior effectiveness in reacting with and curing hydroxy reactive resins, such as the epoxy resins.

The copolymers and terpolymers of this invention can be prepared under the following conditions:

a. Polymerization of butadiene and 2-phenyl allyl alcohol in aqueous medium using water soluble persulfates, such as ammonium persulfate, potassium persulfate, potassium persulfate-sodium bisulfite redox system and the like, azo catalysts such as 2,2'-azobisisobutyronitrile or azobisisobutyro carboxylate esters, at temperatures ranging from 40° to 100°C., preferably in the range of 45° to 80°C., and at initiator concentrations in effective amounts, such as ranging from 0.1 to 10 percent, preferably from 1 to 5 percent, based on weight of monomers, using if desired sodium oleate, sodium lauryl sulfate, potassium laurate, potassium myristate, polyvinyl alcohol or other conventional emulsifying and suspending agents in small amounts, as about 1 to 5 percent, and if desired a polymerization regulator such as tertiary dodecyl mercaptan or any $C_8$ to $C_{16}$ alkyl mercaptan in small amounts, as about 0.5 to 2 percent. The concentration of total monomers (by weight) in the aqueous system will range from about 10 percent to about 90 percent, but will preferably be in the range of about 20–50 percent.

b. Bulk polymerization procedures using from 0.1 to 10 percent, preferably from 1 to 5 percent of 2,2'- azobisisobutyronitrile initiator at 40°–100° C., preferably from 45° to 80° C.

c. Bulk polymerization procedures using from 0.1–10 percent, preferably from 1 to 5 percent diisopropyl benzene hydroperoxide-sodium formaldehyde sulfoxylate, diisopropyl benzene hydroperoxide, tertiary butyl hydroperoxide, cumene hydroperoxide, dicumyl peroxide (or other hydroperoxides and peroxides having similar half-lives) at polymerization temperatures ranging from 50° to 150° C.

d. Solution polymerization with azo initiators such as 2,2'-azobisisobutyronitrile or azobisisobutyro carboxylate esters using aromatic solvents such as benzene, toluene, xylene, cumene or paraffinic solvents such as cyclohexane n-heptane, n-octane, petroleum naphtha and the like. Temperatures will be preferably in the range of 45°–80° C, but may range from 40° to 100°C. with the azo catalysts.

e. Solution polymerization in xylene or cumene solvent using initiators such as tertiary butyl hydroperoxide, diisopropyl benzene hydroperoxide, cumene hydroperoxide or dicumyl peroxide at temperatures ranging from 100° to 190° C.

f. Terpolymerization of butadiene, styrene and 2-phenyl allyl alcohol in aqueous medium using sodium oleate, potassium laurate, potassium myristate, sodium lauryl sulfate, "Igepal" emulsifying agents, ammonium salt of styrene-maleic anhydride resins and derivatives, polyvinyl alcohol or any other conventional emulsifying and suspending agents in small amounts such as about 1 to 5 percent, with water soluble persulfate initiators such as ammonium persulfate, potassium persulfate, potassium persulfate-sodium bisulfite redox system and the like, or with water insoluble azo catalysts such as 2,2'-azobisisobutyronitrile or azobisisobutyro carboxylate esters at temperatures ranging from 40° to 100° C, preferably in the range of 45° to 80° C and at initiator concentrations ranging from 0.1 to 10 percent, preferably from 1 to 5 percent, and preferably a polymerization regulator, such as tertiary dodecyl mercaptan or any $C_8$ to $C_{16}$ alkyl mercaptan in small amount, as about 0.5 to 2 percent. The concentration of total monomers (by weight) in the aqueous system will range from about 10 percent to about 90 percent, but will preferably be in the range of about 20–50 percent.

In all of these polymerization processes, the monomer concentrations may be varied from about 10 to 85 weight percent of 2-phenyl allyl alcohol and about 90 to 15 weight percent of butadiene to provide polymers of the desired molar ratios of 2-phenyl allyl alcohol to butadiene. When a terpolymer is desired, the weight percent of 2-phenyl allyl alcohol is about 18 to 40, the weight percent of butadiene is about 16 to 42 and the weight percent of styrene is about 66 to 18.

Molecular weights may be varied by changing temperature, e.g., higher temperatures result in the production of lower molecular weight polymers. Catalysts concentrations also may be varied to produce polymers of a desired molecular weight, e.g., as the catalyst concentration is increased, the molecular weight will increase. In general, peroxide catalysts are not efficient for copolymerizing 2-phenyl allyl alcohol with butadiene, or butadiene-styrene mixture, in bulk, solution or other systems. Hydroperoxides give good results in solution copolymerizations and azo catalysts, such as 2,2'-azobisisobutyronitrile, give outstanding results for making copolymers of 2-phenyl allyl alcohol with butadiene and terpolymers of 2-phenyl allyl alcohol-butadiene and styrene, particularly using aqueous emulsion procedures.

Azo catalysts employed in the polymerization of the present invention can be the symmetrical azo compounds having an azo group, —N = N—, bonded from each of the nitrogen atoms to tertiary carbon atoms. The azo compounds can be represented by the structure:

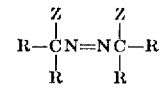

wherein R is an aliphatic, including cycloaliphatic, hydrocarbon of up to about 11 carbon atoms with the total carbon atoms on each side of the azo group being preferably about 4 to 11 and Z is selected from the group consisting of —CN,

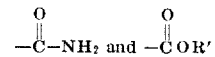

wherein R' is lower alkyl, say of one to six carbon atoms. R in the structural formula may be saturated or unsaturated, straight or branched chain, and is preferably alkyl, such as lower alkyl of one to six carbon atoms. The preferred catalysts are the alpha, alpha'-azobis(alkane-nitriles).

Illustrative of suitable azo type catalysts are alpha, alpha'-azodiisobutyronitrile, alpha, alpha'-azobis(alpha, gamma-dimethylvaleronitrile), alpha, alpha'-azobis(alphamethylbutyronitrile), alpha, alpha'-azobis(alphaethylbutyronitrile), alpha, alpha'-azobis(alpha-phenylpropionitrile), alpha, alpha'-azobis(alpha-cyclopropylpropionitrile), alpha, alpha'-azobis(alpha-cyclohexylpropionitrile), alpha, alpha'-azobis(alpha-cycloheptylpropionitrile), alpha, alpha'-azobis(alpha-isopropyl-beta-methylbutyronitrile), alpha, alpha'-azobis(alpha, gamma-dimethylcapronitrile), alpha, alpha'-azobis(alpha-n-butyl-capronitrile), alpha, alpha'-azobis(alpha-isobutyl-gamma-methylvalernitrile), alpha, alpha'-azobis(alpha-methyl-gamma-carboxy-butyronitrile) and its salts, e.g., disodium gamma, gamma'-azobis-(gamma-cyano-valerate), 1,1'-azodicyclohexanecarbonitrile, 1,1'-azodicycloheptanecarbonitrile, 1,1''-azobis(3-methylcyclopentanecarbonitrile, 1,1'-azobis(2,4-dimethycyclohexane-carbonitrile), and the corresponding amides and esters of the above in which the nitrile group or groups are replaced by amide and/or ester groups, e.g., to give alpha, alpha'-azodiisobutyramide, alpha, alpha'-azobis(alpha, gamma-dimethylvaleramide), alpha, alpha'-azobis-(alpha-cyclopropylpropionamide), 1,1'-azodicyclohexane-carbon-amide, N,N'-alpha, alpha'-azodiisobutyrodimethylamide, dimethyl, diethyl and dihexyl-alpha, alpha'-azodiisobutyrate.

Aqueous dispersion polymerization employing 2,2'-azobisisobutyronitrile initiator is the preferred method since this method affords high conversion rate of monomers to polymers. Emulsion polymerization utilizing potassium persulfate free radical catalyst is also preferred for optimum results in terpolymerization.

Solution polymerization initiated at high temperature by a hydrocarbon hydroperoxide, such as tertiary butyl hydroperoxide is an efficient way to prepare liquid castable copolymers of 2-phenyl allyl alcohol and butadiene.

The catalyst is used in effective amounts and larger amounts are used to achieve rapid reaction rates and high degrees of conversion.

In the following examples which are illustrative of the invention, the copolymers were obtained by addition polymerization of butadiene and 2-phenyl allyl alcohol in the mole ratio of 1:1, 2:1, 4:1, 5:1, 10:1 and 22:1. In terpolymerization reactions, styrene was introduced into the system as a termonomer and used mainly in excess of butadiene and 2-phenyl allyl alcohol. The monomers were allowed to react for periods up to 60 and 88 hours, and sometimes longer, under 60–80 pounds pressure, generally at 50° C., using 200 ml. glass pressure bombs. In higher temperature tests, a stainless steel stirred autoclave was used.

Agitation was provided by end-over-end rotation of the pressure bottles set in a constant temperature bath maintained at the temperature of polymerization.

The 2-phenyl allyl alcohol comonomer was added to the solvent, the emulsifier solution, or the aqueous solution containing the dispersing agent. These reaction media were introduced into the bottles. Initiator and other reagents were then added, and dissolved or dispersed in the mixtures.

In these series of tests conducted in solution, suspension and emulsion systems, the average monomers concentration was 33.0 percent.

The mixtures were deaerated with a nitrogen bubbler and cooled to about −15° C. with dry ice. Liquid butadiene was measured volumetrically in slight excess or weighed in slight excess and added to the frozen mixtures. By evaporation of the excess of butadiene, air was expelled from the bottles. Finally, a stream of gaseous butadiene was used to sweep the bottles free from air before closing. After a preheating time of approximately 20 minutes in icy water, the mixtures were allowed to react in a warm water bath kept at the desired temperature.

At the completion of the reaction, the mixtures were cooled to approximately −15° C. and the bottles opened. The unreacted butadiene monomer was evolved during the slow melting of the mixtures at room temperature. The rubbery copolymers were separated from the reaction media by precipitation in methanol or by freezing and washing with methanol.

After separation from the mother-liquors by decantation, the semi-solid precipitates or coagula were washed again in methanol and triturated until complete precipitation. Generally, unreacted 2-phenyl allyl alcohol was removed from the coagula during the precipitation and washing operations by dissolving in methanol.

The substances were slowly filtered and the resulting transparent rubbers were dried at 40°–45° C. in vacuo until complete dryness. The copolymers were purified by dissolving in chloroform or tetrahydrofuran, filtering the polymer solutions and precipitating in methanol. Conversion of monomers to polymers was determined gravimetrically.

The bound 2-phenyl allyl alcohol content of the copolymers was estimated by determination of the hydroxyl value for the samples and by infra red spectroscopy for the most characteristic specimens.

As may be seen from the data given in Tables I and VII, initiations in bulk, solution and suspension polymerizations were conducted mainly with 2,2'-azobisisobutyronitrile utilized at 1.0 percent and 5.0 percent level.

A few tests were performed with diisopropyl benzene hydroperoxide and tertiary butyl hydroperoxide. In the case of emulsion polymerization, water soluble initiators such as ammonium persulfate, potassium persulfate and potassium persulfate-sodium bisulfite redox system were utilized as well.

EXAMPLE I

Bulk copolymerizations of 2-phenyl allyl alcohol (2-PAA) and butadiene (Bd) were carried out with 2,2'-azobis-isobutyronitrile (AIBN) catalyst at 50° C. for 60 hours. With a 1 to 1 mole ratio of monomers, fair to good conversions to alternating copolymers were achieved as shown in Table 1. At a 1 percent weight of azo catalyst, a yield of 40.92 percent of a light-yellow firm rubbery copolymer was obtained (Test 271). With a 5 percent weight of azo catalyst a yield of 72.80 percent of a light-yellow firm rubbery copolymer was obtained (Test 272).

With a mole ratio of 2-phenyl allyl alcohol to butadiene of 1:22, at 1 percent weight of azo catalyst a 11.89 percent yield of a light brown viscous sticky copolymer was Test (test 292). With the same mole ratio of 1:22 at 5 percent weight of azo catalyst a 27.95 percent yield of a light brown oily copolymer was obtained Test 293).

Bulk copolymerization of 2-phenyl allyl alcohol and butadiene was also carried out with diisopropyl benzene hydroperoxide (DIBH) at 3 weight percent and sodium formaldehyde sulfoxylate (SFS) 2 weight percent. With a 1:1 mole ratio, there was obtained 28.16 percent yield of a light-yellow firm rubbery copolymer (Test 270).

In comparative tests, 32.45 gms. (0.60 mole) of butadiene were homopolymerized at 50° C. for 60 hours with 1 percent and 5 percent 2,2'-azobisisobutyronitrile catalyst respectively, giving 3.69 percent and 24.03 percent yields of a clear yellow oily, viscous homopolymer of butadiene. These yields of homopolymer are much lower than the yields of the copolymer under the same polymerization conditions. The structure of the butadiene homopolymer was determined with a double beam infra red spectrophotometer. Unsaturated distribution in polybutadiene was about 66.17 percent trans-1-4-addition, 13.01 percent cis-1-4-units and 20.82 percent 1-2-(vinyl) pendants.

TABLE I

Bulk Copolymerization of 2-Phenyl Allyl Alcohol and Butadiene at 50° C. for 60 Hours

| Test No. | 2PAA, moles grams | Bd, moles grams | Molar ratio | Composition 2PAA, wt. percent | Bd, wt. percent | Initiator, wt. percent | Product yield, wt. percent | Polymer state |
|---|---|---|---|---|---|---|---|---|
| 270 | 0.30 mole 40.23 gms | 0.30 mole 16.22 gms | 1:1 | 71.27 | 28.73 | DIBH 3.0% SFS 2.0% | 28.16 | Lt. yellow firm rubbery copolymer. |
| 271 | 0.30 mole 40.23 gms | 0.30 mole 16.22 gms | 1:1 | 71.27 | 28.73 | AIBN 1.0% | 40.92 | Yellow soft rubbery copolymer. |
| 272 | 0.30 mole 40.23 gms | 0.30 mole 16.22 gms | 1:1 | 71.27 | 28.73 | AIBN 5.0% | 72.80 | Lt. yellow firm rubbery copolymer. |
| 292 | 0.04 mole 5.36 gms | 0.88 mole 47.59 gms | 1:22 | 10.13 | 89.87 | AIBN 1.0% | 11.89 | Lt. brown viscous sticky copolymer. |
| 293 | 0.04 mole 5.36 gm | 0.88 mole 47.59 gms | 1:22 | 10.13 | 89.87 | AIBN 5.0% | 27.95 | Lt. brown oily copolymer. |

NOTE.—DIBH = diisopropyl benzene hydroperoxide. SFS = sodium formaldehyde sulfoxylate. AIBN = 2,2'-azobisisobutyronitrile.

EXAMPLE II

Solution copolymerizations of 2-phenyl allyl alcohol and butadiene were carried out in organic solvents, such as benzene and xylene. Table II illustrates the results of a number of solution polymerizations performed in benzene solution with 2,2'-azobisisobutyronitrile (ATBN) catalyst, some of the tests using tertiary dodecyl mercaptan (TDM) as a regulator. For example, in benzene at 50° C. for 110 hours, (Test 377), 2,2'-azobisisobutyronitrile used at 5 weight percent with 0.5 percent TDM yielded 41.10 percent of a 1:4 copolymer.

In xylene solution at 120° C. (Test 382), employing 19.88 weight percent 2-phenyl allyl alcohol and 80.12 weight percent of butadiene at a monomer concentration of 53.0 percent in xylene, there was isolated, after 3 hours of polymerization in the presence of 9.0 percent tertiary butyl hydroperoxide, a 40 percent yield of 1:10 molar ratio oily copolymer of 2-phenyl allyl alcohol and butadiene. Molecular weight by vapor pressure difference osmometer gave readings of 1,750 and 1,874. The elemental analysis was theory C, 87.18, H, 10.45, O, 2.37; found C, 86.11, H, 10.97, O, 2.92. Infra red measurements revealed major-trans-1-4, some vinyl-1-2, few cis-1-4 and hydroxyl groups in the copolymer.

EXAMPLE III

The copolymerization of 2-phenyl allyl alcohol and butadiene and the terpolymerization with styrene in aqueous suspension at 50° C. with 2,2-azobisisobutyronitrile (AIBN) is shown in Table III. Polyvinyl alcohol at 3.0 percent concentration was used as a dispersing agent. This method of polymerization affords great simplicity in finished product work-up, e.g. no solvent other than water is required. The polymer is formed as gummy lumps and may be isolated by filtering the aqueous reaction medium, followed by drying of the coagulum.

In Tests 241 and 376, at a 2,2'-azobisisobutyronitrile concentration of 5.0 percent, a 1:1 and 1:4 molar ratio of 2-phenyl allyl alcohol and butadiene dispersed with 3.0 percent polyvinyl alcohol, afforded 43.05 percent and 55.66 percent yields copolymer after reacting respectively 60 hours and 110 hours at 50° C. In Test 376 there was used 0.5 percent of tertiary dodecyl mercaptan as a polymerization regulator. A terpolymerization involving about 20 weight percent 2-phenyl allyl alcohol, 20 weight percent butadiene and 60 weight percent styrene conducted under the same conditions as Test 241 gave 90.18 percent of a light yellow soft tacky rubber (Test 281).

TABLE II

Solution Copolymerization of 2-Phenyl Allyl Alcohol and Butadiene at 50° C. in Benzene at Monomers Concentration of 33.0 Weight Percent

| Test No. | Monomers, wt. percent | Mole ratio | Initiator, wt. percent | Reaction time, hours | Conversion percent polymer insoluble in CH₃OH | M.W. V.P. diff. osmometer | Polymer state |
|---|---|---|---|---|---|---|---|
| 232 | 71.27% 2PAA 28.73% Bd | 1:1 | AIBN 1.0% No TDM | 85 | 8.23 | Insoluble in chloroform | Lt. yellow rubbery copolymer. |
| 233 | 71.27% 2PAA 28.73% Bd | 1:1 | AIBN 5.0% No TDM | 85 | 12.75 | do | Do. |
| 381 | 71.27% 2PAA 28.73% Bd | 1:1 | AIBN 5.0% TDM 0.5% | 86 | 19.92 | | Lt. yellow brown rubbery copolymer. |
| 230 | 55.36% 2PAA 44.64% Bd | 1:2 | AIBN 1.0% No TDM | 60 | 14.03 | Hydroxyl number F/Th. 177.6/231.52=76.71%. | Lt. yellow rubbery copolymer. |
| 231 | 55.36% 2PAA 44.64% Bd | 1:2 | AIBN 5.0% No TDM | 60 | 13.28 | Hydroxyl number F/Th. 169.3/231.52=73.12%. | Do. |
| 377 | 38.28% 2PAA 61.72% Bd | 1:4 | AIBN 5.0% TDM 0.5% | 110 | 41.10 | Insoluble in chloroform | Hazy lt. yellow brown viscous oil. |

TABLE III

Suspension Copolymerization of 2-Phenyl Allyl Alcohol and Butadiene in Water at 50° C. and at Monomers Concentration of 33.0 Weight Percent and Polyvinyl Alcohol 3.0 Weight Percent

| Test No. | Monomers, wt. percent | Mole ratio | Initiator, wt. percent | Reaction time, hours | Conversion percent polymer insoluble in CH₃OH | M.W. VP diff. osmometer | Hydroxyl number found/theory |
|---|---|---|---|---|---|---|---|
| 240 | 71.27% 2PAA 28.73% Bd | 1:1 | AIBN 1.0% No TDM | 60 | 27.63% Light yellow rubbery elastomer. | Insoluble in CHCl₃. | 231.9/298.04 = 77.80% |
| 241 | 71.27% 2PAA 28.73% Bd | 1:1 | AIBN 5.0% No TDM | 60 | 43.05% Light yellow rubbery elastomer. | 1,254 | 300.0/298.04 = 100% |
| 244 | 71.27% 2PAA 28.73% Bd | 1:1 | AIBN 1.0% No TDM | 60 | 20.46% Light yellow rubbery elastomer. | 829 | 269.5/298.04 = 90.42% |
| 376 | 38.28% 2PAA 61.72% Bd | 1:4 | AIBN 5.0% TDM 0.5% | 110 | 55.66% Light brown viscous oil. | Insoluble in CHCl₃. | |

Table III—Continued

Suspension Terpolymerization of 2-Phenyl Allyl Alcohol, Butadiene and Styrene in Water at 50° C. and at Monomers Concentration of 33.0 Weight Percent and Polyvinyl 3.0 Weight Percent

| | | | | | | |
|---|---|---|---|---|---|---|
| 281 | 20.06% 2PAA ... 0.06 mole<br>20.21% Bd ... 0.15 mole<br>59.72% styrene ... 0.21 mole | AIBN 5.0% | 60 | 90.18% | | Light yellow soft tacky rubber. |
| 282 | 30.30% 2PAA ... 0.06 mole<br>30.52% Bd ... 0.15 mole<br>39.18% styrene ... 0.10 mole | AIBN 5.0% | 60 | 66.24% | | Light brown viscous tacky rubber. |

[1] Duplicate of 240.
[2] TDM = Tertiary dodecylmercaptan

EXAMPLE IV

Emulsion copolymerization tests with typical emulsion catalysts, such as ammonium persulfate and potassium persulfate, failed to achieve high conversion rates as shown in Tables IV and V.

In a typical example, Test 277, a mixture of 38.28 weight percent of 2-phenyl allyl alcohol and 61.72 weight percent butadiene, corresponding to a mole ratio of 1 to 4 was placed in a 8 oz. pressure bottle with 2.0 percent potassium persulfate, 5.0 percent sodium oleate and 0.5 percent tertiary dodecyl mercaptan. The mixture was degassed. After shaking the solution at 50° C. for 60 hours, a 18.26 percent yield of copolymer was obtained.

When 2-phenyl allyl alcohol and butadiene were reacted in a 1 to 1 molar ratio for 86 hours at 50° C. as shown in Table V, Test 254, with 2.0 percent ammonium persulfate and 5.0 percent sodium oleate, a light brown rubber was isolated in a yield of 36.67 percent. Test 375 in Table V illustrates the case of a 1:4 molar ratio of 2-phenyl allyl alcohol to butadiene reaction performed at the same conditions for 110 hours in which a viscous rubber was recovered with 29.68 percent conversion.

A low-temperature emulsion copolymerization using a cold SBR (Styrene-Butadiene Rubber) recipe was attempted in the presence of a diisopropyl benzene hydroperoxide, sodium formaldehyde sulfoxylate, ferrous sulfate, ethylene dinitrilo tetraacetic acid, potassium sulfate activating system. The 1:5 molar ratio of 2-phenyl allyl alcohol to butadiene mixture was emulsified by 3.0 percent potassium oleate prepared "in situ" and allowed to react for 60 hours at +6° to +10° C. Very little polymerization took place.

EXAMPLE V

Table VI summarizes results of polymerization tests wherein 2-phenyl allyl alcohol and butadiene were emulsion or bead polymerized at monomer molar ratios of 1:1, 1:4 and 1:22 at 33.0 percent monomers concentration.

In typical Tests 249–3, 250–3, 374, 296 and 297, by heating 2-phenyl allyl alcohol and butadiene to 50° C. with 1.0 percent and 5.0 percent 2,2'azobisisobutyronitrile for periods of 60 to 110 hours at molar ratios of 1:1, 1:4 and 1:22, the conversion to copolymer was quantitative. These results were obtained with a system containing water, 5.0 weight percent sodium oleate and 0.5 weight percent tertiary dodecyl mercaptan based on the weight of monomers charged. In Test 374, the elemental analysis was Theory, C, 85.66 percent, H, 9.78 percent, O, 4.56 percent; Found C, 88.30 percent, H, 10.40 percent, O, 1.30 percent. Rubbers of various degrees of tack and plasticity having structures consisting largely of trans-1-4-links, with a lesser amount of vinyl-1-2-units, few cis-1-4-links and hydroxyl groups present, as measured in Tests 374 and 278, were prepared in this manner.

At mole ratios of 1:1, copolymers were obtained in which the monomers alternate with near perfect regularity along the chain.

TABLE IV

Emulsion Copolymerization of 2-Phenyl Allyl Alcohol and Butadiene in Water at 50° C. and at Monomers Concentration of 33.0 Weight Percent

| Test No. | Monomers, wt. percent | Mole ratio | Initiator, wt. percent | Emulsifier, wt. percent | Reaction time, hours | Conversion percent polymer insoluble in CH$_3$OH | M.W. V.P. diff. osmometer | Polymer state |
|---|---|---|---|---|---|---|---|---|
| 277 | 38.28% 2PAA<br>61.72% Bd | 1:4 | K$_2$S$_2$O$_8$, 2.0% | 5.0% Na oleate<br>0.5% TDM | 60 | 18.26%<br>Hydroxyl number<br>F/Th. 83.2/160.07 =<br>51.97%. | Insoluble in CHCl$_3$. | Lt. brown firm rubber. |
| 380 | 38.28% 2PAA<br>61.72% Bd | 1:4 | K$_2$S$_2$O$_8$, 2.0% | 5.0% Na lauryl sulf.<br>0.5% TDM | 86 | 15.70% | do | Lt. brown rubber slightly tacky. |

TABLE V

Emulsion Copolymerization of 2-Phenyl Allyl Alcohol and Butadiene in Water at 50° C. and at Monomers Concentration of 33.0 Weight Percent

| Test No. | Moles Bd | Moles 2PAA | Molar ratio | Composition, wt. percent | Initiator wt. percent reaction | Emulsifier wt. percent conditions | Product yield and comments | Hydroxyl number F/Th. |
|---|---|---|---|---|---|---|---|---|
| 253 | 0.20M | 0.20M | 1:1 | 28.73<br>71.27 | 1.0% (NH$_4$)$_2$S$_2$O$_8$ at 50° C.-86 h | 5.0% Na oleate | 31.09% Lt. brown rubbery rubbery material insoluble in CHCl$_3$. | $\frac{268.8}{298.04}$ = 90.18% |
| 254 | 0.20M | 0.20M | 1:1 | 28.73<br>71.27 | 2.0% (NH$_4$)$_2$S$_2$O$_8$ at 50° C.-86 h | do | 36.67% Lt. brown rubbery material. | $\frac{231.5}{298.04}$ = 77.67% |
| 249 | 0.30M | 0.15M | 2:1 | 44.64<br>55.36 | 1.0% (NH$_4$)$_2$S$_2$O$_8$ at 50° C.-60 h | do | 17.61% Brown rubbery material. | $\frac{54.3}{231.52}$ = 23.45% |
| 250 | 0.30M | 0.15M | 2:1 | 44.64<br>55.36 | 2.0% (NH$_4$)$_2$S$_2$O$_8$ at 50° C.-60 h | do | 16.51% Lt. brown rubbery material. | $\frac{214.6}{231.52}$ = 92.69% |
| 375 | 0.40M | 0.10M | 4:1 | 61.72<br>38.28 | 2.0% (NH$_4$)$_2$S$_2$O$_8$ at 50° C.-110 h | 5.0% Na oleate<br>0.5% t-Dod M. | 29.68% Lt. brown viscous rubber M.W.V.P. diff. osmometer 866. | $\frac{117.0}{160.07}$ = 73.09% |

TABLE VI

Copolymerization of 2-Phenyl Allyl Alcohol and Butadiene in Emulsion System in Water at 50° C. and at Monomers Concentration of 33.0 Weight Percent with 5.0% Na Oleate and 0.5% t-Dod. Mer.

| Test No. | 2PAA moles grams | Bd moles grams | Molar ratio | Composition 2PAA, Bd, wt. percent | Initiator, wt. percent | Reaction time, hours | Product yield, wt. percent, hydroxyl value F./Th. |
|---|---|---|---|---|---|---|---|
| 249-3 | 0.20 mole 26.83 gms | 0.20 mole 10.81 gms | 1:1 | 71.27 28.73 | AIBN 1.0% | 60 | Quantitative. Lt.-colored firm rubbery copolymer. F./Th. 183.2/298.04=61.46%. Infrared wt. percent 2PAA=57.2%. |
| 250-3 | 0.20 mole 26.83 gms | 0.20 mole 10.81 gms | 1:1 | 71.27 28.73 | AIBN 5.0% | 60 | Quantitative. Slightly yellow viscous tacky rubber. M.W.=495. F./Th.=188.4/298.04=63.11%. Infrared wt. percent 2PAA=42.8%. |
| 278 | 0.10 mole 13.41 gms | 0.40 mole 21.62 gms | 1:4 | 38.28 61.72 | AIBN 5.0% | 88 | 75.93%. Lt. brown oily viscous copolymer. M.W.=421. F./Th.=121.2/160.07=75.71%. Major trans, minor vinyl, few cis Bd, some —OH. |
| 374 | 0.10 mole 13.41 gms | 0.40 mole 21.62 gms | 1:4 | 38.28 61.72 | AIBN 5.0% | 110 | Quantitative. Pale rubbery semi-elastic copolymer. Insoluble in $C_6H_6$ and in $CHCl_3$. F./Th.=123.0/160.07=76.84%. Major trans, minor vinyl few cis Bd, some —OH. |
| 296 | 0.02 mole 2.68 gms | 0.44 mole 23.79 gms | 1:22 | 10.13 89.87 | AIBN 1.0% | 60 | Quantitative. Lt. yellow soft rubber. |
| 297 | 0.02 mole 2.68 gms | 0.44 mole 23.79 gms | 1:22 | 10.13 89.87 | AIBN 5.0% | 60 | Quantitative. Yellow firm rubbery polymer. |

This method of emulsion copolymerization of 2-phenyl allyl alcohol and butadiene in aqueous dispersions with 2,2'-azobisisobutyronitrile catalyst is highly preferred. The yield is usually approximately quantitative of a light colored rubber of low molecular weight up to about 1,500 measured by osmometry. These polymers are mostly insoluble in benzene and dimethylsulfoxide but completely soluble in tetrahydrofuran and dioxane. The products are easily isolated, e.g., the polymer is isolated simply by filtration, washing and drying.

EXAMPLE VI

The results of typical emulsion terpolymerization tests with water soluble persulfates, e.g., potassium persulfate and with potassium persulfate and sodium bisulfite redox system, are shown in Table VII. Various emulsifiers were utilized, among them sodium oleate, and a mixture of "SMA 1420H" resin, "Igepal 630" and "Igepal 990." Best results were attained with the sodium oleate-potassium persulfate system. Several runs were repeated with satisfactory agreement. High yields of terpolymers were achieved when styrene monomer was used in large amounts. In typical Tests 255 and 256, a monomer mixture consisting of 59.72 weight percent styrene, 20.21 weight percent butadiene and 20.05 weight percent 2-phenyl allyl alcohol was placed in a heavy glass Champagne bottle with 1.0 percent and 2.0 percent potassium persulfate respectively and 5.0 percent sodium oleate based on the weight of monomers charged. The tests were conducted at the 33 percent monomers level under inert atmosphere. After shaking the emulsion at 50° C. for a period of 60 hours, 82.39 percent and quantitative yields of light colored hard rubbery solids were obtained respectively.

In Tests 257 and 258 the weight percent of emulsifiers was as follows:

| SMA 1420H | 12.02% |
| Igepal 630 | 0.30% |
| Igepal 990 | 0.30% |

In Tests 261 and 262 the weight percent of emulsifiers was as follows:

| SMA 1420H | 6.01% |
| Igepal 630 | 0.15% |
| Igepal 990 | 0.15% |

Igepal 630 is a liquid emulsifier and Igepal 990 is a wax emulsifier designated by the manufacturer respectively as "Igepal CO 630" and "Igepal CO 990" which are alkyl-phenoxypoly(oxyethylene) ethanols where alkyl is $C_8H_{17}$ and higher homologues.

TABLE VII

Terpolymerization of Styrene, Butadiene and 2-Phenyl Allyl Alcohol in Emulsion System in Deionized Water at 50° C. and at Monomers Concentration of 33.0 Weight Percent

| Test No. | Moles styrene, Bd, 2PAA | Wt. percent styrene, Bd, 2PAA | Initiator, wt. percent | Emulsifier, wt. percent | Product yield, percent | Comments |
|---|---|---|---|---|---|---|
| 255 | 0.21 0.15 0.06 | 59.72 20.21 20.05 | 1.0% $K_2S_2O_8$ | 5.0% Na oleate | 82.39 | Lt.-brown, sl. hard, rubbery material. |
| 256 | 0.21 0.15 0.06 | 59.72 20.21 20.05 | 2.0% $K_2S_2O_8$ | do | Quantitative | Do. |
| 257 | 0.21 0.15 0.06 | 59.72 20.21 20.05 | 0.75% $K_2S_2O_8$ 0.375% $NaHSO_3$ | SMA 1420H Igepal 630 Igepal 990 | 39.56 | Yellow rubbery, sl. hard material. |
| 258 | 0.21 0.15 0.06 | 59.72 20.21 20.05 | 1.50% $K_2S_2O_8$ 0.75% $NaHSO_3$ | SMA 1420H Igepal 630 Igepal 990 | 16.02 | Greyish crumbly resin. |
| 263 | 0.10 0.15 0.06 | 39.18 30.52 30.30 | 1.0% $K_2S_2O_8$ | 5.0% Na oleate | 16.50 | Lt.-yellow, rubbery polymer. |

Table VII—Continued

Terpolymerization of Styrene, Butadiene and 2-Phenyl Allyl Alcohol in Emulsion System in Deionized Water at 50° C. and at Monomers Concentration of 33.0 Weight Percent

| Test No. | Moles styrene, Bd, 2PAA | Wt. percent styrene, Bd, 2PAA | Initiator, wt. percent | Emulsifier, wt. percent | Product yield, percent | Comments |
|---|---|---|---|---|---|---|
| 264 | 0.10<br>0.15<br>0.06 | 39.18<br>30.52<br>30.30 | 2.0% $K_2S_2O_3$ | ...do... | 22.20 | Brown soft rubbery polymer. |
| 261 | 0.10<br>0.15<br>0.06 | 39.18<br>30.52<br>30.30 | 0.75% $K_2S_2O_3$<br>0.375% $NaHSO_3$ | SMA 1420H<br>Igepal 630<br>Igepal 990 | 14.67 | Greyish crumbly resin. |
| 262 | 0.10<br>0.15<br>0.06 | 39.18<br>30.52<br>30.30 | 1.50% $K_2S_2O_8$<br>0.75% $NaHSO_3$ | SMA 1420H<br>Igepal 630<br>Igepal 990 | 62.10 | Lt.-yellow rubbery polymer. |
| 267 (duplicate of 256) | 0.84<br>0.60<br>0.24 | 59.72<br>20.21<br>20.05 | 2.0% $K_2S_2O_3$ | 5.0% Na oleate | 33.18 | Lt.-yellow rubbery polymer (poor stirring). |

Note.—Reaction Time: 60 hours, except for 257*, 258*=24 hours.
"SMA 1420H"=hydrolyzed n-butyl "Cellosolve" 50% half ester of 1:1 mole ratio styrene-maleic anhydride polymer.
"Igepal 630" and "Igepal 990" alkylphenoxypoly(oxyethylene) ethanols where alkyl is $C_8H_{17}$ and higher homologues.

It is claimed:

1. An addition copolymer of 2-phenyl allyl alcohol and butadiene consisting of 2-phenyl allyl alcohol and butadiene in a molar ratio of about 1:1 added alternatively with substantial regularity along said chain, the major portion of the butadiene in said copolymer having the trans-1-4 structure.

* * * * *